(12) United States Patent
Paciotti

(10) Patent No.: US 8,932,169 B2
(45) Date of Patent: Jan. 13, 2015

(54) CLUTCH BACKING PLATE WITH FLUID DRAIN

(71) Applicant: GM Global Technology Operations LLC, Detroit, MI (US)

(72) Inventor: Robert Neil Paciotti, White Lake, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 125 days.

(21) Appl. No.: 13/733,940

(22) Filed: Jan. 4, 2013

(65) Prior Publication Data

US 2014/0190782 A1 Jul. 10, 2014

(51) Int. Cl.
*F16D 13/52* (2006.01)

(52) U.S. Cl.
CPC ...................................... *F16D 13/52* (2013.01)

USPC ..................... 475/159; 192/70.12; 192/113.35

(58) Field of Classification Search
CPC ................ F16D 2300/0214; F16D 2500/5029; F16D 2500/70448; F16D 2500/7045
USPC .............................. 192/113.35, 113.3, 113.31
See application file for complete search history.

(56) References Cited

U.S. PATENT DOCUMENTS

2013/0310211 A1* 11/2013 Wilton et al. .............. 192/70.11

* cited by examiner

*Primary Examiner* — Rodney H Bonck

(57) ABSTRACT

A backing plate for a friction clutch pack includes a shoulder or flange through which a plurality of radial drain passageways extend. The radial drain passageways intersect a circumferential channel which collects hydraulic fluid from the friction clutch. The radial passageways, assisted by centrifugal force, direct hydraulic fluid flow radially outwardly, away from other friction pack clutches and thus prevent such fluid from creating drag and causing increased spin losses as it flows to and through disengaged clutch packs.

16 Claims, 3 Drawing Sheets

CLUTCH BACKING PLATE WITH FLUID DRAIN

FIELD

The present disclosure relates to friction pack clutches for automatic motor vehicle transmissions and the like and more particularly to a backing plate for a friction pack clutch or assembly for an automatic motor vehicle transmission having a plurality of hydraulic fluid drain holes.

BACKGROUND

The statements in this section merely provide background information related to the present disclosure and may or may not constitute prior art.

Friction pack clutches in automatic motor vehicle transmissions are generally pressure lubricated, that is, hydraulic (transmission) fluid under pressure is delivered to the friction clutch pack or its near vicinity to lubricate and cool the interleaved plates or discs of the clutch. Depending upon whether the clutch is engaged or disengaged, the hydraulic fluid flow will generally take one or another of two paths.

Moreover, depending upon the configuration of the automatic transmission, at least one of the paths will result in redirection of the hydraulic fluid flow often to at least one other, typically disengaged, friction clutch pack. This occurs because, generally speaking, the relaxed plates or discs of a disengaged clutch represent a fluid flow path. When this occurs, hydraulic fluid flow, while providing cooling, may significantly increase spin losses in the disengaged clutch due to the viscosity of the hydraulic fluid. This, of course, reduces the overall efficiency of the transmission and increases fuel consumption. It should be understood that if the clutch is engaged, fluid flow does not occur between the clutch plates and the problem addressed by this invention does not exist.

Thus, there is a need in the art to reduce spin losses of disengaged friction clutches in automatic transmissions caused by flow of hydraulic fluid from other components into and through such disengaged friction clutch plates or discs.

SUMMARY

The present invention provides a backing plate for a friction clutch pack having a shoulder or flange through which a plurality of radial drain holes or passageways extend and a circumferential groove which intersects the passageways. The circumferential groove collects hydraulic fluid and the radial passageways, aided by centrifugal force, direct hydraulic fluid flow radially outwardly, away from other friction pack clutches and thus prevent such fluid from causing increased spin losses as it flows to and through adjacent disengaged friction clutch packs.

Thus it is an aspect of the present invention to provide an automatic transmission having reduced spin losses caused by transmission fluid flowing through disengaged friction clutches.

It is a further aspect of the present invention to provide an automatic transmission having friction clutch packs with backing plates including an axially extending shoulder or flange.

It is a still further aspect of the present invention to provide a friction clutch pack with a backing plate including an axially extending shoulder or flange and intersecting circumferential groove.

It is a still further aspect of the present invention to provide an automatic transmission having friction clutch packs with backing plates including an axially extending shoulder or flange and a plurality of radially oriented fluid passageways.

It is a still further aspect of the present invention to provide a friction clutch pack with a backing plate including an axially extending shoulder or flange and a plurality of radially oriented fluid passageways.

It is a still further aspect of the present invention to provide a friction clutch pack with a backing plate including an axially extending shoulder or flange and a plurality of radially oriented fluid passageways which direct hydraulic fluid flowing through the clutch radially outwardly.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
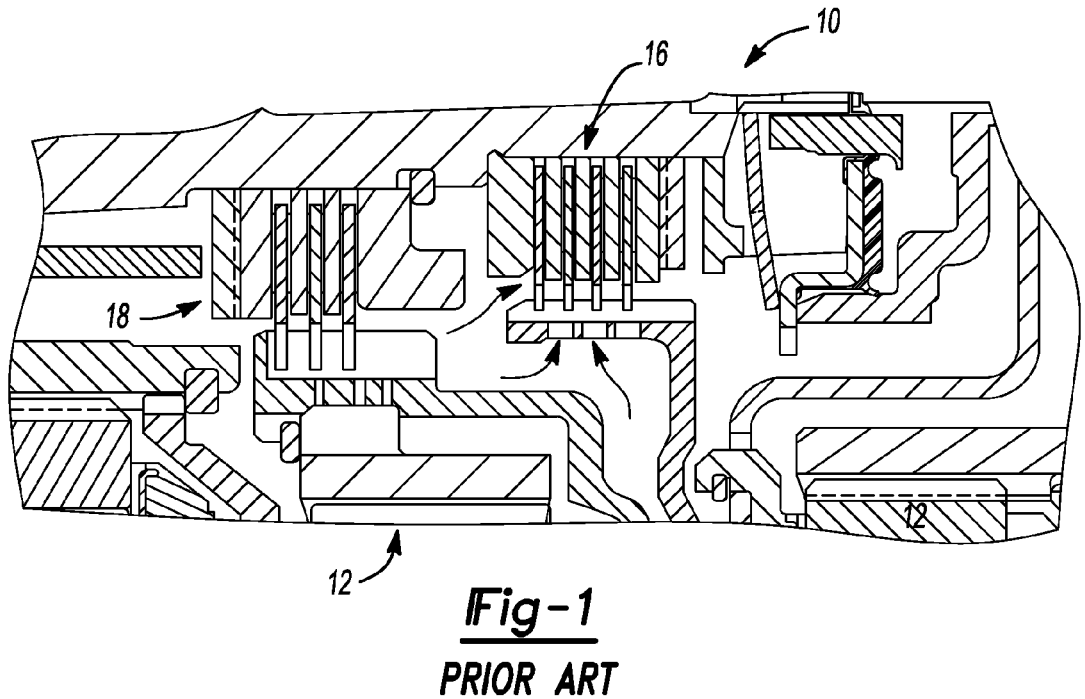
FIG. 1 is a fragmentary, sectional view of portion of a prior art automatic transmission illustrating a hydraulic fluid flow path from a engaged friction clutch to a disengaged friction clutch.

With reference to FIG. 1, an illustration of a portion of a prior art transmission specifically including a pair of adjacent friction clutch packs or assemblies is identified by the reference number 10. The prior art transmission 10 typically includes a plurality of planetary gear assemblies, portions of which are identified by the reference numbers 12. Operably disposed between the planetary gear assemblies 12 and other rotating and stationary components are a pair of friction clutch packs or assemblies 16 and 18. An outer friction clutch pack or assembly 16 is shown in a disengaged mode or state and an inner friction clutch assembly 18 is shown in an engaged mode or state. As such and during operation, hydraulic (transmission) fluid or oil will flow around the ends of the friction clutch pack 18, aided by centrifugal force. Due to the kinetic energy of the hydraulic fluid and various pressure differentials within the automatic transmission 10, it may also flow axially where it will flow into and between the plates or discs of the outer clutch pack 16 which, for purposes of this explanation and as noted above, is disengaged. This hydraulic fluid flow is indicated by the arrows in FIG. 1.

The flow of hydraulic fluid into the disengaged, outer friction clutch pack 16 will tend to create a viscous coupling between the plates or discs connected to the input and the output of the friction clutch pack 16, thereby generating excessive drag and increasing the spin losses of the friction clutch pack 16 and the overall transmission 10. It should be appreciated that the foregoing example, while relating to only one engaged and one disengaged friction clutch pack or assembly, applies to all friction clutch packs within a transmission when they are in a disengaged state and particularly when they are disengaged and subject to a flow of hydraulic fluid from adjacent components, typically clutches, and therefore capable of generating drag and increasing spin losses.

Figure 2:
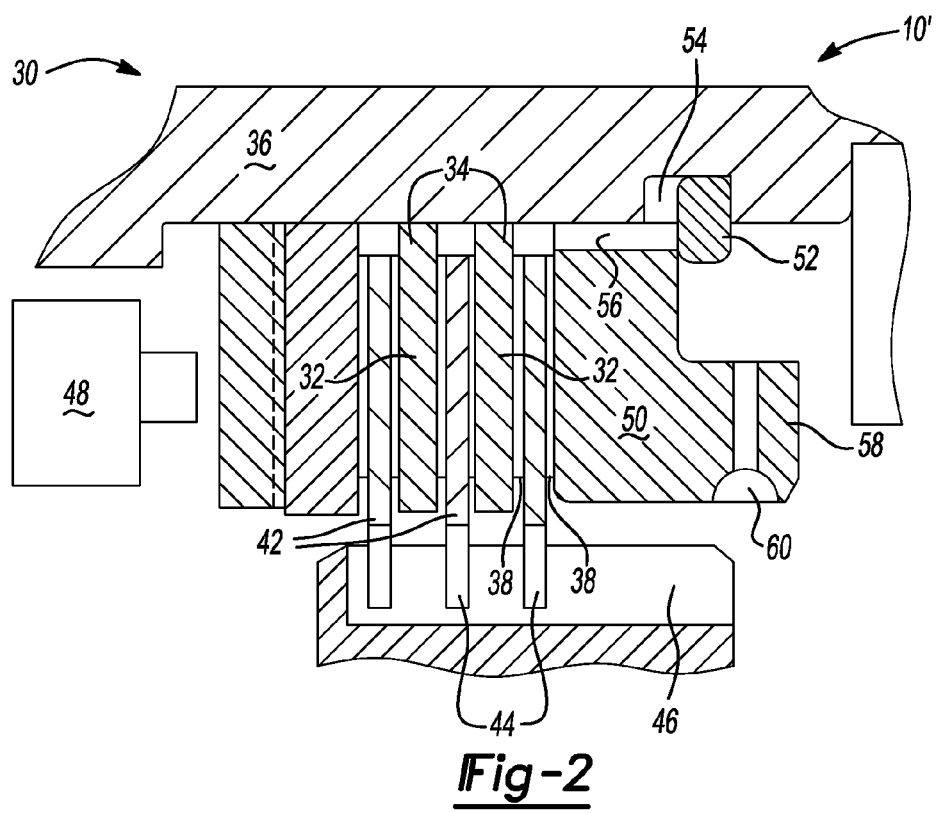
FIG. 2 is an enlarged, fragmentary, sectional view of a portion of an automatic transmission incorporating the present invention.

Referring now to FIG. 2, a portion of an automatic transmission 10' is illustrated which includes an inner friction clutch pack or assembly 30 incorporating the present invention. The friction clutch pack 30 includes a first plurality of larger diameter friction clutch plates or discs 32 which are coupled by interengaging male and female splines 34 to an outer annular torque carrying member 36. In accordance with conventional friction clutch practice, at least one face of the friction clutch plates or discs 32 include friction material 38. The friction clutch pack 30 also includes a second plurality of interleaved smaller diameter clutch plates or discs 42 which are coupled by interengaging male and female spline sets 44 to an inner torque carrying member 46 and may include friction material 38. At one end of the friction clutch pack 30 (the left end in FIG. 2) is disposed a hydraulic, electric or pneumatic operator 48 which selectively provides an axial compressive force to the friction clutch pack 30 to cause torque transfer therethrough.

At the other end of the friction clutch pack or assembly 30 (the right end in FIG. 2) is disposed an annular backing plate or disc 50. The backing plate 50 is located and restrained against axial motion away from the operator 48 and the friction clutch pack 30 by a snap ring 52 or similar component received and seated within a circumferential channel or groove 54. The backing plate 50 thus functions as a stop or travel limit against which the first and second friction plates or discs 32 and 42 are compressed. The backing plate 50 also include male splines 56 disposed about its periphery that are complementary to the female splines of the interengaging male and female spline sets 34 which engage the first, larger diameter friction plates or discs 32 and couple it to the outer annular torque carrying member 36.

Figure 3:
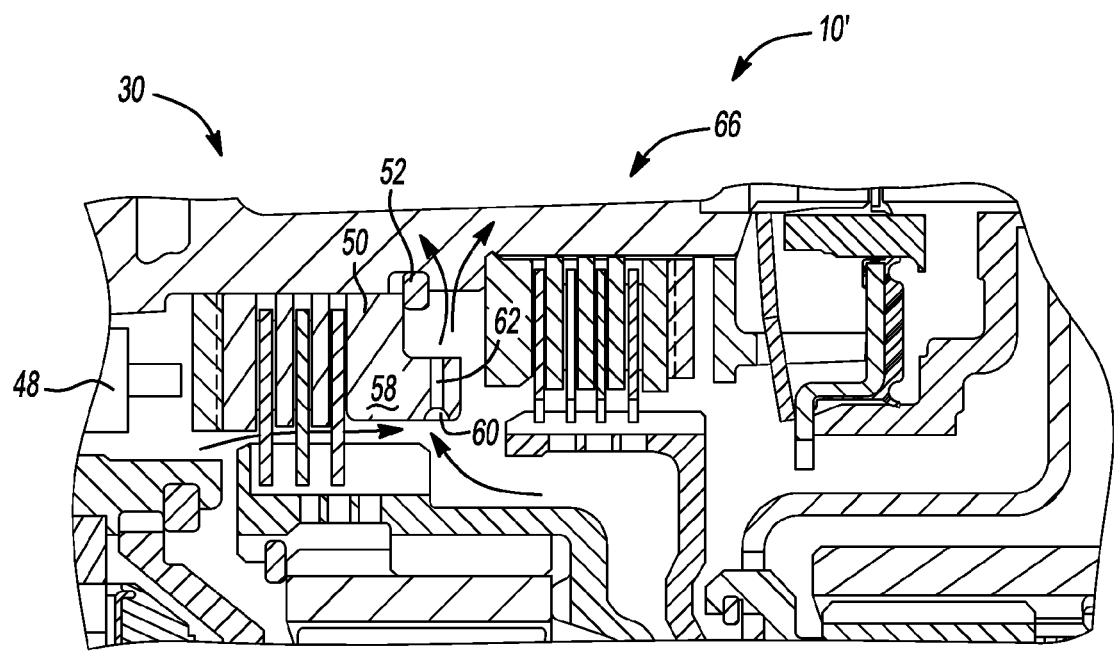
FIG. 3 is a fragmentary, sectional view of portion of an automatic transmission illustrating a hydraulic fluid flow path through an engaged friction clutch incorporating the present invention.

Referring now to FIGS. 2 and 3, the backing plate 50 includes an annular shoulder or flange 58 that extends axially away from the backing plate 50 proper. The backing plate 50 thus defines an "L" in cross section, with the foot of the "L" (the shoulder or flange 58) being closer to the center axis of the transmission 10. On the inner face of the shoulder, ledge or flange 58 is a circumferential channel or groove 60 that intersects a plurality or circumferentially spaced apart radial passageways, bores or drain holes 62. It will be appreciated that hydraulic fluid flowing generally around and along the inner surface of the friction clutch pack 30 will be collected in the circumferential channel or groove 60 and then, due to either or both pressure differentials within the transmission 10 and centrifugal force, be directed radially outwardly as illustrated and indicated by the arrows in FIG. 3, thereby preventing hydraulic fluid flow from being directed to and entering one or more adjacent friction clutch packs or assemblies 66 and causing drag and spin losses therein.

Figure 4:
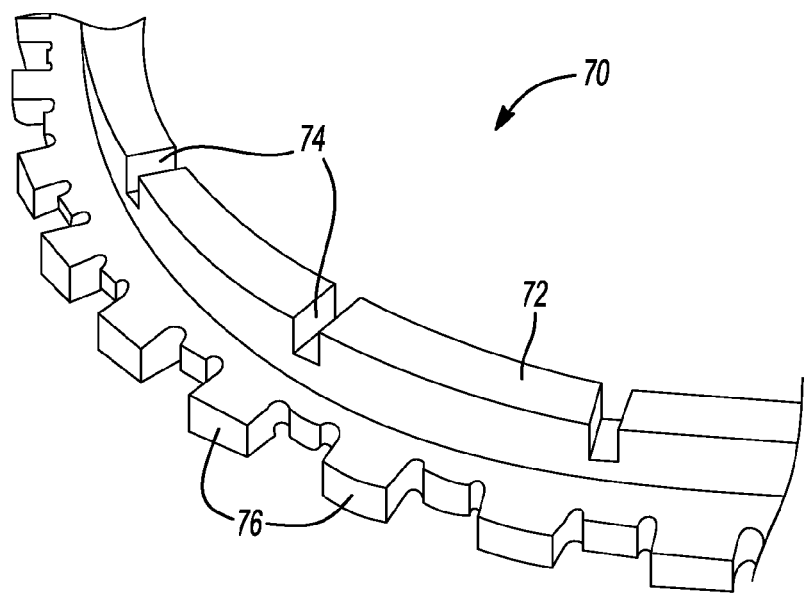
FIG. 4 is a perspective view of a portion of an alternate embodiment of a clutch backing plate incorporating the present invention.

Referring now to FIG. 4, an alternate embodiment backing plate or disc incorporating the present invention is illustrated and generally designated by the reference number 70. The alternate embodiment backing plate or disc 70 is again generally "L" shaped in cross section and includes an axially extending shoulder or flange 72. Radial cuts, slots or channels 74 extend through the shoulder or flange 72 and again facilitate radial fluid flow directed by both pressure differentials within transmission 10 and centrifugal force. The alternate embodiment backing plate 70 preferably also includes male splines 76 about its periphery which engage complementary splines on a clutch component. The slotted configuration of the alternate embodiment backing plate 70 is especially suited to production by powdered metal techniques and materials.

Figure 5:
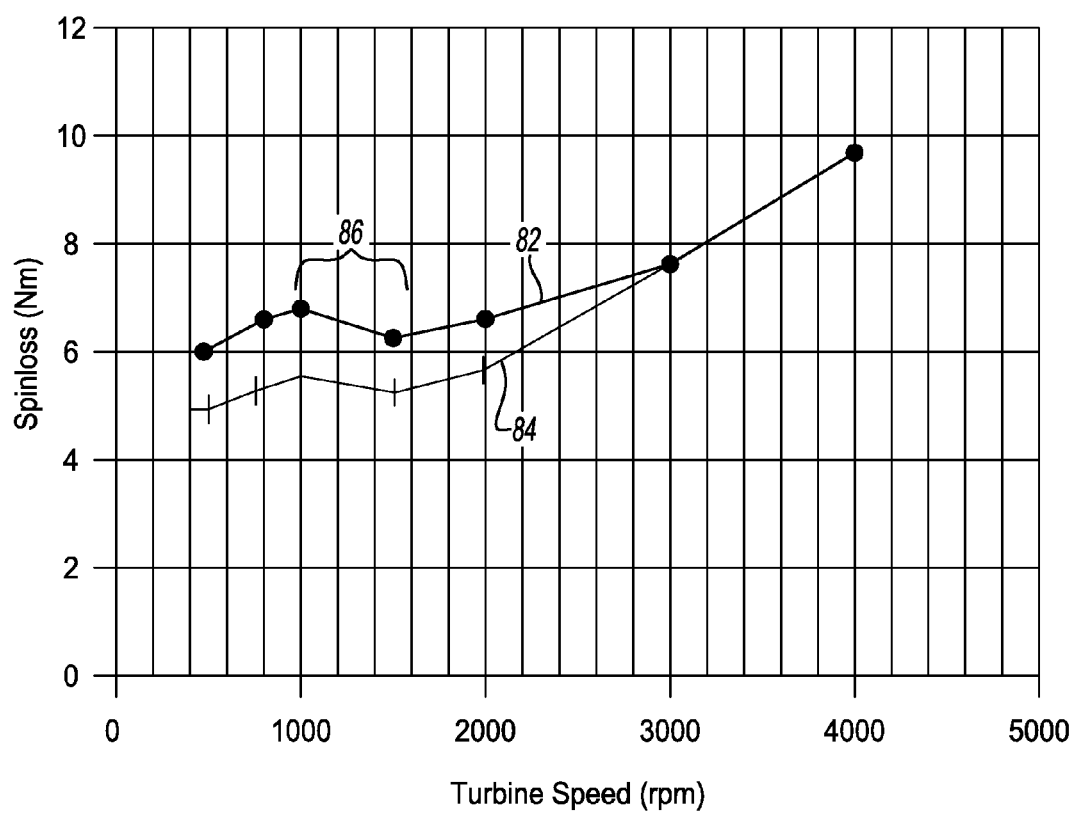
FIG. 5 is a graph illustrating the spin loss of a typical prior art friction clutch and the reduction in spin loss for a typical disengaged friction clutch which is disposed proximate a clutch incorporating the present invention.

Referring now to FIG. 5, a comparison of performance between a prior art disengaged friction clutch and a disengaged clutch disposed proximate a friction clutch incorporating the present invention is illustrated. The horizontal (X) axis represents and displays the turbine speed of the transmission 10 in revolutions per minute (RPM) and the vertical (Y) axis represents and displays spin loss in Newton meters (Nm). The upper line 82 which includes several data points relates to a typical disengaged prior art friction clutch, such as the friction clutch 16 illustrated in FIG. 1, which is exposed to a flow of hydraulic fluid from adjacent components, such as the friction clutch 18 also illustrated in FIG. 1, that increases drag within the clutch and thus increases the spin loss of the transmission. The lower line 84 relates to the performance of a disengaged friction clutch, such as the clutch 66 illustrated in FIG. 3, that is proximate an engaged friction clutch incorporating the flow diverting and directing passageways 62 or slots 74 in the backing plate 50 and 70 of the present invention, such as the friction clutch 30 also illustrated in FIG. 3. Note that within the speed range defined by the bracket 86 which is typical of normal driving, there is a marked reduction in spin loss.

The description of the invention is merely exemplary in nature and variations that do not depart from the gist of the invention are intended to be within the scope of the invention. Such variations are not to be regarded as a departure from the spirit and scope of the invention.

What is claimed is:

1. A friction clutch pack for an automatic transmission comprising, in combination,
 a plurality of first clutch plates coupled to a drive member,
 a plurality of second clutch plates interleaved with said plurality of first clutch plates and coupled to a driven member,
 an actuator disposed on one side of said pluralities of clutch plates, and
 a backing plate disposed on another side of said pluralities of clutch plates, said backing plate including an axially extending flange disposed adjacent an inner surface of said backing plate, a plurality of radial passageways extending through said flange and a circumferential channel on an inner surface of said flange communicating with said radial passageways.

2. The friction clutch pack of claim 1 wherein said actuator is one of electric, hydraulic and pneumatic.

3. The friction clutch pack of claim 1 wherein said backing plate is retained in one of said drive and driven members by a cooperating snap ring and groove.

4. The friction clutch pack of claim 1 wherein at least one face of said first and second clutch plates includes friction material.

5. The friction clutch pack of claim 1 wherein said backing plate is fabricated of powdered metal.

6. The friction clutch pack of claim 1 further including at least one planetary gear assembly having a component coupled to one of said drive and said driven members of said friction clutch pack.

7. A friction clutch pack for an automatic transmission comprising, in combination,
 a plurality of first clutch plates coupled by first interengaging splines to a drive member,
 a plurality of second clutch plates interleaved with said plurality of first clutch plates and coupled by second interengaging splines to a driven member,
 an actuator disposed on one end of said pluralities of clutch plates, and
 an annular backing disc disposed on an opposite end of said pluralities of clutch plates, said backing disc including an axially extending flange disposed adjacent an inner surface of said backing disc, a plurality of radial passageways extending through said flange and a circumferential channel on an inner surface of said flange communicating with said radial passageways.

8. The friction clutch pack of claim 7 wherein said actuator is one of electric, hydraulic and pneumatic.

9. The friction clutch pack of claim 7 wherein said backing disc is retained in one of said drive and driven members by a cooperating snap ring and groove.

10. The friction clutch pack of claim 7 wherein one face of said first and second clutch plates includes friction material.

11. The friction clutch pack of claim 7 wherein said backing disc is fabricated of powdered metal.

12. The friction clutch pack of claim 7 further including at least one planetary gear assembly having a component coupled to one of said drive and said driven members of said friction clutch pack.

13. A friction clutch pack for an automatic transmission comprising, in combination,
 a plurality of first clutch plates coupled by first interengaging splines to a drive member,
 a plurality of second clutch plates interleaved with said plurality of first clutch plates and coupled by second interengaging splines to a driven member,
 an actuator disposed on one end of said pluralities of clutch plates, and
 a backing plate disposed on an opposite end of said pluralities of clutch plates, said backing plate including an axially extending flange disposed adjacent an inside surface of said backing plate, a plurality of radial passageways extending through said flange and a circumferential channel on an inside surface of said flange intersecting said radial passageways.

14. The friction clutch pack of claim 13 wherein said actuator is one of electric, hydraulic and pneumatic.

15. The friction clutch pack of claim 13 wherein said backing plate is retained in one of said drive and driven members by a cooperating snap ring and groove.

16. The friction clutch pack of claim 13 wherein one face of said first and second clutch plates includes friction material.

\* \* \* \* \*